(12) United States Patent
Müller et al.

(10) Patent No.: US 11,928,874 B2
(45) Date of Patent: Mar. 12, 2024

(54) DETECTION OF MOVING OBJECTS

(71) Applicant: SICK AG, Waldkirch (DE)

(72) Inventors: Romain Müller, Waldkirch (DE); Dirk Strohmeier, Waldkirch (DE)

(73) Assignee: SICK AG, Waldkirch (DE)

( * ) Notice: Subject to any disclaimer, the term of this patent is extended or adjusted under 35 U.S.C. 154(b) by 35 days.

(21) Appl. No.: 17/320,803

(22) Filed: May 14, 2021

(65) Prior Publication Data

US 2021/0356268 A1    Nov. 18, 2021

(30) Foreign Application Priority Data

May 15, 2020   (DE) .......................... 102020113183.6

(51) Int. Cl.
| | | |
|---|---|---|
| *H04N 5/232* | (2006.01) | |
| *G01C 3/08* | (2006.01) | |
| *G06K 7/14* | (2006.01) | |
| *G06V 10/147* | (2022.01) | |
| *G06V 10/25* | (2022.01) | |

(Continued)

(52) U.S. Cl.
CPC .............. *G06V 20/64* (2022.01); *G01C 3/08* (2013.01); *G06K 7/1413* (2013.01); *G06K 7/1417* (2013.01); *G06V 10/147* (2022.01); *G06V 10/25* (2022.01); *H04N 23/60* (2023.01)

(58) Field of Classification Search
CPC .................................. H04N 5/232; G01C 3/08
USPC ........................................................ 348/135
See application file for complete search history.

(56) References Cited

U.S. PATENT DOCUMENTS

2017/0176578 A1* 6/2017 Rae ...................... G01S 17/003
2018/0157376 A1* 6/2018 Lemarchand ........... G06F 3/017
(Continued)

FOREIGN PATENT DOCUMENTS

| DE | 102008020416 B3 | 9/2009 |
|---|---|---|
| DE | 102014110203 B3 | 8/2015 |
| DE | 102017129609 A1 | 6/2019 |

(Continued)

OTHER PUBLICATIONS

Arif, Omar, et al. "Tracking and Classifying Objects on a Conveyor Belt Using Time-Of-Flight Camera"; 27th International Symposium on Automation and Robotics in Construction (ISARC 2010); Atlanta, Georgia.

(Continued)

*Primary Examiner* — Jeffery A Williams
(74) *Attorney, Agent, or Firm* — Nath, Goldberg & Meyer; Jerald L. Meyer; Stanley N. Protigal

(57) ABSTRACT

A camera (10) for detecting objects (48) moving relative to the camera (10) in a direction of movement (50), comprising an image sensor (18) for recording image data of the objects (48) in a camera field of view (14, 56), an optoelectronic distance sensor (24) using a time-of-flight method having a plurality of measurement zones (30*a*) for measuring a plurality of distance values to the objects (48) in a distance measurement field of view (58), and a control and evaluation unit (38) configured to find, by measuring distance values over a configuration time and evaluating the distance values and/or their change, a region where objects (48) move, and to automatically set a region of interest (60) for the distance sensor (24) within the distance measurement field of view (58) by determining an object region as the region where objects (48) move.

13 Claims, 3 Drawing Sheets

(51) Int. Cl.
  *G06V 20/64*  (2022.01)
  *H04N 23/60*  (2023.01)

(56) References Cited

U.S. PATENT DOCUMENTS

2018/0348369 A1\* 12/2018 Ohki ..................... B60W 30/09
2019/0281199 A1\* 9/2019 Müller ................. G01S 17/894

FOREIGN PATENT DOCUMENTS

| DE | 102018105301 A1 | 9/2019 |
| EP | 2708914 A1 | 3/2014 |
| EP | 3339887 B1 | 4/2019 |

OTHER PUBLICATIONS

German Office Action dated Apr. 20, 2021 corresponding to application No. 102020113183.6.
Park, Ho-min, et al. "Box-Scan: An Efficient and Effective Algorithm for Box Dimension Measurement in Conveyor Systems Using a Single RGB-D Camera"; 2019; The Institute of Industrial Applications Engineers; Japan.

\* cited by examiner

DETECTION OF MOVING OBJECTS

FIELD

The invention relates to a camera and a method for detecting objects moving in a direction of motion.

BACKGROUND

In industrial applications, cameras are used in a variety of ways to automatically detect object properties, for example for inspecting or measuring objects. Images of the object are acquired and evaluated by image processing methods according to the task. One application of cameras is the reading of codes. An image sensor is used to record objects bearing the codes, to identify the code areas in the images and to decode the codes. Camera-based code readers can readily cope with code types other than one-dimensional bar codes, having, like a matrix code, a two-dimensional structure and providing more information. The automatic text detection of printed addresses (OCR, Optical Character Recognition) or handwriting is also, in principle, a kind of code reading. Typical areas of application for code readers are supermarket checkouts, automatic package identification, sorting of postal items, baggage handling at airports and other logistics applications.

A common acquisition situation is the mounting of the camera above a conveyor belt. The camera takes images during the relative movement of the object stream on the conveyor belt and initiates further processing steps depending on the object properties obtained. Such processing steps consist, for example, in further processing adapted to the specific object on a machine acting on conveyed objects, or in a change of the object stream in that certain objects are ejected from the object stream as part of a quality control, or in that the object stream is sorted into several partial object streams. If the camera is a camera-based code reader, the objects are identified by the attached codes for correct sorting or similar processing steps.

The camera is often part of a complex sensor system. For example, in the case of reading tunnels on conveyor belts, it is common to measure the geometry of the conveyed objects in advance with a separate laser scanner for determining focus information, triggering times, image areas with objects and the like. This requires numerous manual setup steps for the upstream laser scanner and the correct processing of its input data in the camera.

DE 10 2018 105 301 A1 discloses a camera that has an integrated distance sensor. A plurality of distances can be measured in spatial resolution, but so far, only sequential readout of the plurality of measuring zones of the distance sensor is possible. Therefore, a height profile cannot be reconstructed unambiguously, or only with some effort and knowing the conveying speed of the objects. In DE 10 2018 105 301 A1, the distance sensor is a source of additional information used in the camera. However, a configuration of the distance sensor itself does not take place.

DE 10 2017 129 609 A1 discloses a 3D camera that divides its detection area into columnar cells on a two-dimensional grid. Movements are detected by statistical evaluation of detections in these cells. However, this is not a camera having a distance sensor for determining auxiliary parameters for the camera, but the camera itself measures the distances with the aim of detecting motion as the actual measurement result. A configuration based on these measurements does not take place.

A light receiver is known from EP 2 708 914 A1 or EP 3 339 887 B1 that has avalanche photodiodes in Geiger mode or SPADs (Single-Photon Avalanche Diode) used for determining light times of flight and thus distances. In this case, partial areas of the light receiver can be activated and deactivated by adjusting the bias voltage. Once again, the distances are the actual goal of the measurement and not auxiliary parameters of a camera.

SUMMARY

It is therefore an object of the invention to facilitate the handling of a camera with a distance sensor.

This object is satisfied by a camera for detecting objects moving relative to the camera in a direction of movement, the camera comprising an image sensor for recording image data of the objects in a camera field of view, an optoelectronic distance sensor according to a principle of a time-of-flight method having a plurality of measurement zones for measuring a plurality of distance values to the objects in a distance measurement field of view, and a control and evaluation unit connected to the image sensor and the distance sensor, the control and evaluation unit being configured to find, by measuring distance values over a configuration time and evaluating at least one of the distance values and a change of the distance values, a region where objects move, and to automatically set a region of interest for the distance sensor within the distance measurement field of view by determining an object region as the region where objects move.

The object is also satisfied by a method for detecting objects moving in a direction of movement, wherein image data of the objects are recorded by a camera in a camera field of view and a plurality of distance values to the objects are measured with an optoelectronic distance sensor according to a principle of a time-of-flight method with a plurality of measurement zones in a distance measurement field of view, wherein image data are read out and distance values are evaluated, wherein an region of interest for the distance sensor within the distance measurement field of view is automatically configured by measuring distance values over a configuration time and evaluating at least one of the distance values and a change of the distance values in order to determine an object region as the region where objects move.

Image data of the objects are acquired or recorded with an image sensor. Due to a relative movement between the objects and the camera, the objects move into or through the camera's field of view. In addition to the image sensor, the camera comprises an optoelectronic distance sensor based on the time-of-flight principle having several measuring zones. A measuring zone preferably comprises one or more light-receiving elements. Throughout this specification, the terms preferably or preferred refer to advantageous, but completely optional features. Each measuring zone is capable of measuring a distance value, so that, overall, a measurement of a plurality of distance values with lateral spatial resolution is achieved, where lateral refers to a direction transverse to the direction of movement. The distance sensor has a distance measurement field of view that is to be distinguished from the camera field of view. A control and evaluation unit has access to the image data of the image sensor and the distance sensor.

The invention starts from the basic idea of enabling an automatic configuration of the distance sensor. The goal is defining a region of interest (ROI) for the distance sensor within the distance measurement field of view. It shall be specifically emphasized that this is a configuration and region of interest of the distance sensor and not of the camera itself. An object region is determined where objects are actually moving, because only this area provides relevant information. In particular, this concerns a suitable limitation transverse to the direction of movement, whereas preferably a limitation along the direction of movement also takes place, so that the incoming objects are measured in time.

The region of interest is defined on the basis of the object region, in particular by selecting certain measurement zones. This may mean defining the region of interest just as the object region, but it is also possible to make adjustments still adding or omitting certain sub regions. In order to find the object region, the distance measurement field of view is observed for a certain configuration time. The distance values measured during this configuration time and/or their changes are evaluated. The configuration time, for example, may be predetermined, or it ends when sufficient distance values have been acquired. The configuration time precedes or overlaps with the actual operation, for example in that the distance sensor initially operates with its full distance measurement field of view, later on restricting it to an optimal region of interest gradually or in one step.

The invention has the advantage that a tedious manual adjustment of the distance sensor is replaced by an automatic process. The distance sensor is adjusted for the given orientation of the camera and the existing environment without additional costs, so that very good or even optimal results are reliably achieved that do not depend on the experience of the person setting the system up. Accordingly, the camera can respond to the situation and the measured distance values, for example by triggering a recording, setting a focus position, or adapting an illumination.

The distance sensor preferably is integrated into the camera. This results in a particularly compact design with simple internal data access and significantly simplified mounting. In addition, the mutual alignment of the distance sensor and the camera is known and fixed.

The measuring zones preferably can be read out in parallel. This means that a plurality of distance values with lateral spatial resolution can be acquired virtually simultaneously, resulting in a consistent height profile. With conventional sequential readout, a height profile has to be calculated from the distance values, the different readout times, and the relative movement.

The control and evaluation unit preferably is configured to determine a statistical measure for changes in the distance values of a respective measurement zone over a variation time. For simplification and shortening, the variation time can correspond to or overlap with the configuration time, but is not necessarily bound to it. The statistical measure in particular is a variance or standard deviation of the distance values over the measuring zones. If the statistical measure is above a tolerance threshold, the distance values have changed more than due to noise during the variation time. Therefore, it can be assumed that at least one object has moved through the corresponding measurement zone, which thus belongs to the object region. This measurement and evaluation preferably is performed for all measurement zones.

The control and evaluation unit preferably is configured to determine a respective maximum value of the distance values of a respective measurement zone over a background detection time. The maximum values determined in this way result in a height profile of the background without moving objects. This is because objects are to be regarded as temporary due to their relative movement; they shorten the measured distances compared to the background for as long as they move in the distance measurement field of view. Thus, if the background acquisition time is long enough, taking into account the object sizes and the density of the object stream, a measurement zone will eventually perform a measurement without an object and provide the corresponding maximum value. The background acquisition time may, but from a functional point of view does not have to, coincide or overlap with the configuration time or the variation time, respectively. The background is preferably determined for all measurement zones.

The control and evaluation unit preferably is configured to adjust the region of interest based on the maximum values and an expected background geometry, wherein in particular the adjustment concerns a direction transverse to the direction of movement. In such embodiments, the region of interest is not determined by the object region alone, but is further adapted. This is based on an expectation of the relevant background, in particular that the objects are moved on a flat background, as in the case of a conveyor belt.

The region of interest can be reduced by the adjustment. This is advantageous, for example, if the objects move between lateral structures. Then, during configuration, a measurement zone may have hit a high object still at a relatively shallow angle, although this measurement zone actually only detects the lateral structures when no object is present. Such measurement zones are preferably not supposed to belong to the region of interest, and this can be detected because the maximum value of this measurement zone does not fit the assumption of a flat background geometry.

Conversely, the region of interest can also be enlarged by the adjustment. Thus, measuring zones are included where no object has moved during the configuration time, but where the measuring zone actually still covers a relevant area, for example an edge of a conveyor belt. The region of interest is extended as far as the maximum values correspond to the expected background geometry, in this case the flat conveyor belt. The evaluation for the adjustments, both for a reduction and an enlargement, is preferably done with an application-specific tolerance threshold. The adjustment preferably concerns the transverse direction to the movement direction. This is the direction where lateral structures may exist, and an object anyway passes through all measuring zones arranged in the direction of movement.

The control and evaluation unit preferably is configured to restrict the region of interest along the direction of movement to an entrance region directed towards the moving objects. It is advantageous to obtain the distance values as early as possible so that the camera may adapt in good time prior to an image acquisition taken. This can be achieved using measuring zones that are the first to detect an object, for example a measuring zone or a column of measuring zones that are as far ahead of the camera's field of view as possible in a direction against the direction of motion. Measurement zones located downstream in the direction of motion provide only redundant distance values anyway, at least if the measurement frequency is fast enough. It is not detrimental to the function if additional measuring zones and not only those of the entrance region measure distance values, but this increases the data volume and the complexity of the evaluation.

The distance sensor preferably comprises a plurality of avalanche photodiodes operable in Geiger mode, wherein the control and evaluation unit is configured to adjust the region of interest by selectively activating the Geiger mode in avalanche photodiodes corresponding to the region of interest. In this embodiment, the region of interest or the selection of the measurement zones is not only a software setting, but an activation directly in the front end. Only the active avalanche photodiodes or measuring zones provide distance values in the first place, so that no specific filtering is necessary, and additionally the power consumption of the distance sensor can be reduced. Avalanche photodiode elements in Geiger mode can be activated and deactivated by applying a bias voltage above or below the breakdown voltage.

The distance measurement field of view preferably projects beyond the camera field of view, in particular against the direction of movement. The distance measurement field of view thus effectively is larger than the camera field of view at least in the relevant direction of the incoming object. This makes it easier to detect the relevant distance values for adjusting the camera in good time. Preferably, the distance measurement field of view is larger than the camera field of view at least on both sides along the direction of movement or even also in the transverse direction. Then, there is no fixed preference in the mounting direction of the camera, but a free choice for the configuration of the region of interest in all directions depending on the mounting and environment.

The control and evaluation unit preferably is configured to read out code contents of codes in the recorded image data of the objects. Thus, the camera becomes a camera-based code reader for barcodes and/or 2D codes according to various standards, and possibly also for text recognition (OCR, optical character reading).

The camera preferably is used in stationary mounting on a conveyor device which conveys the objects in the direction of movement. This is a very common industrial application of a camera where the objects are in relative motion to the camera. There is a known, usually flat background at a fixed distance in the form of a conveyor belt or at least trays or containers, and a uniform flow of objects effectively in only one dimension.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
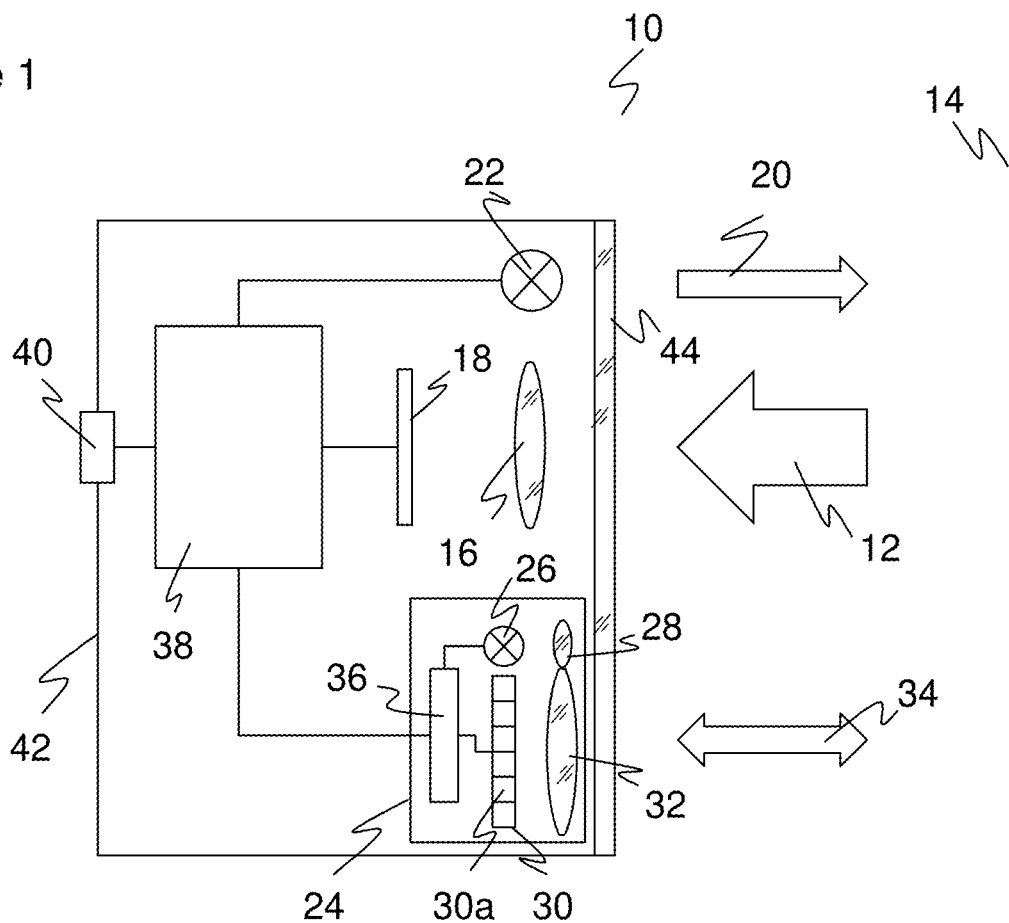
FIG. 1 a schematic sectional view of a camera having an optoelectronic distance sensor.

FIG. 1 shows a schematic sectional view of a camera 10. Received light 12 from a detection area 14 impinges on a receiving optics 16, which guides the received light 12 to an image sensor 18. The optical elements of the receiving optics 16 are preferably designed as an objective comprising a plurality of lenses and other optical elements such as diaphragms, prisms and the like, but are merely represented as a single lens for simplification.

In order to illuminate the detection area 14 with transmitted light 20 during image acquisition of the camera 10, the camera 10 comprises an optional illumination unit 22, which is shown in FIG. 1 in the simplified form of a light source without transmission optics. In other embodiments, multiple light sources, such as LEDs or laser diodes, are arranged, for example, in a ring around the receiving path, which can also be multicolored and controllable in groups or individually to adjust parameters of the illumination unit 22 such as its color, intensity and direction.

In addition to the actual image sensor 18 for capturing image data, the camera 10 has an optoelectronic distance sensor 24 that uses a time-of-flight (ToF) method to measure distances to objects in the detection area 14. The distance sensor 24 includes a TOF light transmitter 26 with TOF transmitter optics 28 and a TOF light receiver 30 with TOF receiver optics 32, for transmitting and receiving a TOF light signal 34. A light time-of-flight measuring unit 36 determines the time of flight of the TOF light signal 34 and, based thereon, the distance to an object where the TOF light signal 34 was reflected.

The TOF light receiver 30 comprises a plurality of light receiving elements 30a. The light receiving elements 30a, individually or in smaller groups, form measuring zones, each determining a distance value. Therefore, not only a single distance value is detected, but the distance values are spatially resolved and can be combined to form a height profile. The measuring zones can preferably be read out in parallel so that a consistent height profile is generated when there is a relative movement between the camera 10 and the detected object. The number of measurement zones of the TOF light receiver 30 may remain comparatively small, for example a few tens, hundreds or thousands of measurement zones, far from usual megapixel resolutions of the image sensor 18.

The shown configuration of the distance sensor 24 is just an example. Optoelectronic distance measurement using time-of-flight light methods is known and therefore will not be explained in detail. Two exemplary measurement methods are photonic mixing detection (PMD) using a periodically modulated TOF light signal 34 or pulse time-of-flight measurement using a pulse-modulated TOF light signal 34. Highly integrated solutions exist, with the TOF light receiver 30 arranged on a common chip together with the time-of-flight measurement unit 36 or at least parts thereof, such as TDCs (time-to-digital converters) for time-of-flight measurements. A TOF light receiver 30 that is configured as a matrix of SPAD light receiving elements 30a (Single-Photon Avalanche Diode) is particularly suitable for this purpose. Measurement zones of SPAD light-receiving elements 30a can be selectively deactivated and activated by setting a bias voltage below or above the breakdown voltage. This allows an active region of the distance sensor 24 to be set. TOF optics 28, 32 are shown as a respective symbol of a single lens only, representing any optics such as a microlens array.

A control and evaluation unit 38 is connected to the illumination unit 22, the image sensor 18 and the distance sensor 38, and it is responsible for the control, evaluation and other coordination tasks in the camera 10. It thus reads image data from the image sensor 18 in order to store or output that image data at an interface 40. Depending on the embodiment, the control and evaluation unit 38 uses the distance values of the distance sensor 24 for various purposes, for example to determine or set camera parameters, to trigger camera functions or to evaluate image data, including preprocessing for an actual evaluation in the camera 10 or a higher-level system. Preferably, the control and evaluation unit 38 is capable of locating and decoding code regions in the image data, making the camera 10 a camera-based code reader.

The camera 10 is protected by a housing 42, having a front window 44 in the front area where the received light 12 is incident.

Figure 2:
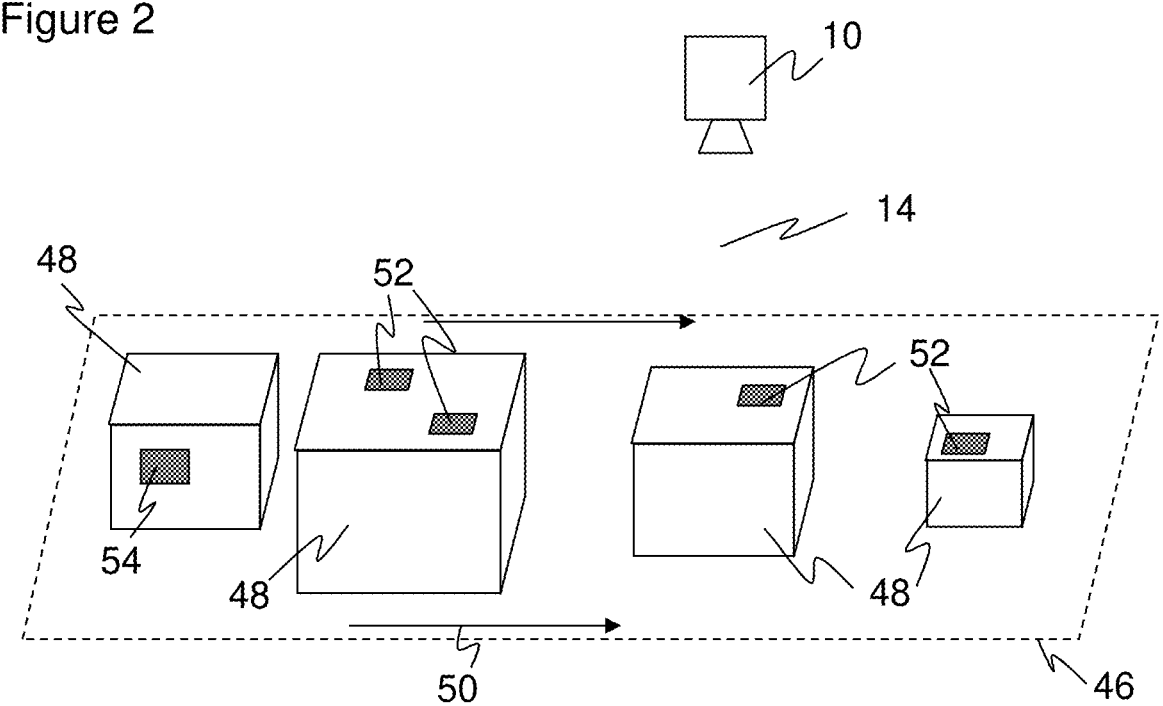
FIG. 2 a three-dimensional view of an exemplary application of the camera mounted at a conveyor belt.

FIG. 2 shows a possible application of the camera 10 stationarily mounted at a conveyor belt 46. Here and in the following, the camera 10 is shown only as a single symbol and no longer with its structure that already has been explained with reference to FIG. 1. The conveyor belt 46 conveys objects 48, as indicated by a direction of movement 50 with an arrow, through the detection area 14 of the camera 10. The objects 48 may bear code areas 52 on their outer surfaces. The task of the camera 10 is to detect properties of the objects 48 and, in a preferred application as a code reader, to detect the code areas 52, to read out the codes, to decode the code content, and to assign the code and its code content to the respective associated object 48. In order to also detect object sides and in particular lateral code areas 54 of codes attached to side surfaces, additional cameras 10, not shown, are preferably used from various perspectives.

FIG. 3 again shows a camera 10 in a sectional view to explain the different fields of view (FOV). In the detection area 14, a camera field of view 56 of the actual camera 10 or its image sensor 18 shown with dotted lines and a distance measurement field of view 58 of the distance sensor 24 shown with dashed lines are distinguished.

According to the invention, the camera 10 is capable of automatically setting a region of interest 60 for the distance sensor 24 as a partial region of the distance measurement field of view 58. For this purpose, it is advantageous if the distance measurement field of view 58 is larger than the camera field of view 56, at least in a direction against the direction of movement 50 corresponding to the incoming objects 48. In order not to limit the possible mounting directions of the camera 10, the distance measurement field of view 58 may be larger in all directions.

The distance sensor 24 detects objects 48 in the region of interest 60 in good time so that the camera 10 has time to adjust to the distance values before the object 48 has reached an acquisition position, for example, in the center of the camera field of view 56. In contrast, an area 62 facing away from the acquisition position is no longer of interest for the distance measurement, at least not as far as settings of the camera 10 are concerned, since such measurements are too late. Depending on the acquisition position, the measuring frequency of the distance sensor 24, and the required duration for distance-dependent adjustments of the camera 10, the area 62 can start earlier, i.e. be shifted farther to the left in FIG. 3. One might call the area 62 the past and the area to the left thereof the future, since objects 48 have already left the acquisition position or will reach it, respectively.

Figure 3:
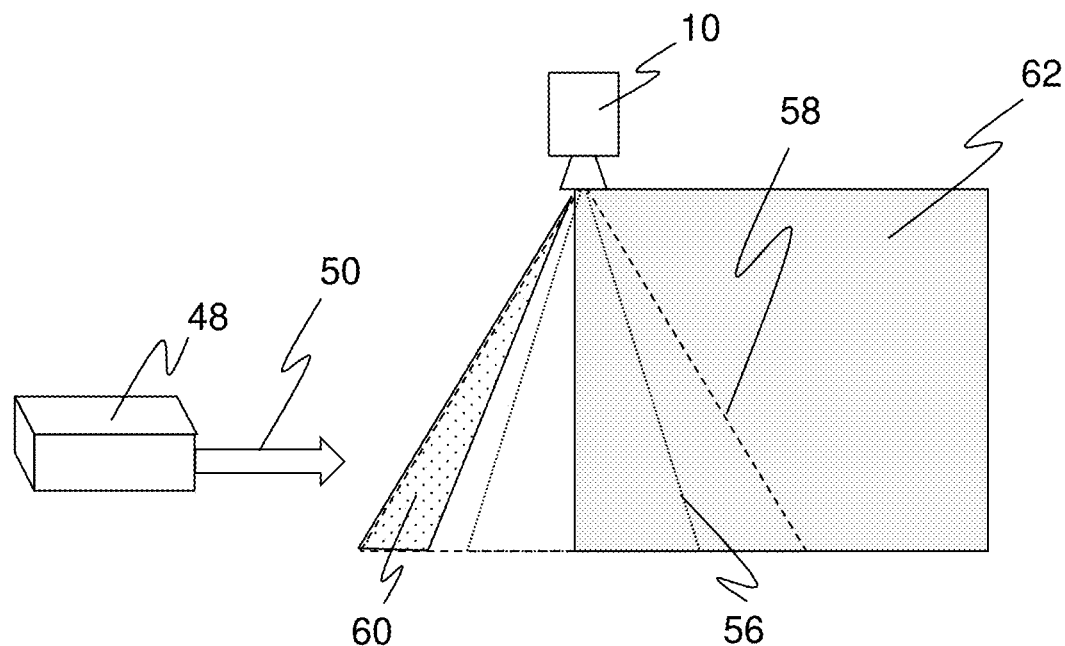
FIG. 3 a schematic sectional view of the camera and the respective fields of view of the camera and distance sensor.

Accordingly, a very coarse selection of the region of interest 60 might only exclude the region 62. However, the region of interest 60 preferably is set more precisely. On the one hand, this may be done along the direction of movement 50 by restriction to an earliest entry range of the objects 48, as shown in FIG. 3. In addition, an adjustment of the region of interest 60 can be made transverse to the direction of movement 50. The goal is to both cover the conveyor belt 46 completely and not to cover any side regions beyond the conveyor belt 46. A precisely set region of interest 60 reduces the amount of data and required bandwidth and thus also simplifies the evaluation. In addition, it is conceivable to increase the measuring frequency of the distance sensor 24 if its operating range is reduced to fewer measuring zones. As mentioned above, the region of interest 60 is preferably adjusted by selectively activating corresponding SPAD light receiving elements 30a in the associated measurement zones.

An exemplary automatic method for setting the region of interest 60 will now be explained. In principle, the region of interest 60 could be set manually, for example in a configuration menu of the camera 10. According to the invention, however, this should be done automatically, for example by the camera 10 starting a corresponding self-calibration at the push of a button, automatically setting and activating the appropriate region of interest 60 for the distance sensor 24.

The adjustment of the region of interest 60 relates to the direction along and across the direction of movement 50. Along the direction of movement 50, as explained with respect to FIG. 3, a distinction is to be made between past and future. This is done on the basis of the direction of movement 50, for example, by activating those measuring zones which are oriented furthest towards the incoming objects 48, such as a first column of light receiving elements 30a. Parameters of the movement of the objects 48, such as the direction of movement 50 and also the speed v of the conveyor belt 46, can be parameterized, be communicated by a connected higher-level controller, or be measured. For an autonomous measurement of these parameters, a height profile of at least one object 48 may be tracked, for example by detecting distance values associated with a time stamp.

The measurement repetition frequency of the distance sensor 24 should be high enough to detect an object 48 once or preferably a plurality of times before it has moved to the acquisition position. Formally, this may be expressed as the condition $\Delta t_{TOF} \ll D/v$, with measurement period $\Delta t_{TOF}$ of the distance sensor 24, distance D between the entry position of the objects 48 into the region of interest 60 and the acquisition position, and speed v of the conveyor belt 46. In the situation of FIG. 3, the distance D can be calculated via the half extent of the distance measurement field of view 58 at the level of the conveyor belt 46.

In the direction transverse to the direction of movement 50, the region of interest 60 preferably is set just so that all objects 48 on the conveyor belt 46 and no other objects are detected. One possible criterion is that just the width of the conveyor belt 46 should be encompassed. In an automatic configuration method, the object flow may be observed for a certain period of time. This can be done during a configuration phase prior to operation, but it is also possible to start with a region of interest 60 that is poorly adjusted, or not adjusted at all, with an optimal region of interest being found during ongoing operation.

Based on this observation and continuous measurement of distance values, on the one hand, the background can be determined, namely the conveyor belt 46 and any lateral areas next to it that are also within the distance measurement field of view 58. To that end, the respective maximum distance value is determined for each measurement zone. The objects 48 are regarded as transient, the distance sensor 24 may be conceived as waiting, by means of the maximum value determination, for a suitable moment per measuring zone when the background at least briefly becomes visible.

On the other hand, the change in the distance values per measurement zone is determined, for example in the form of a variance or standard deviation. There is a significant change only in the measuring zones through which an object 48 has moved. In the other measurement zones, only the same distance is always observed. In order to exclude a change caused by noise, a noise threshold preferably is defined. The measuring zones showing more than noise-related change are selected as the object region.

The region of interest 60 can be identified with the object region. Preferably, however, some further adjustment is made. There may be regions that do belong to the conveyor belt 46 but where by chance no object 48 has ever moved during the time of observation. Since it is known that the conveyor belt 46 forms a plane, the object region can be extended to where the same plane is continued on the basis of the background.

Figure 4:
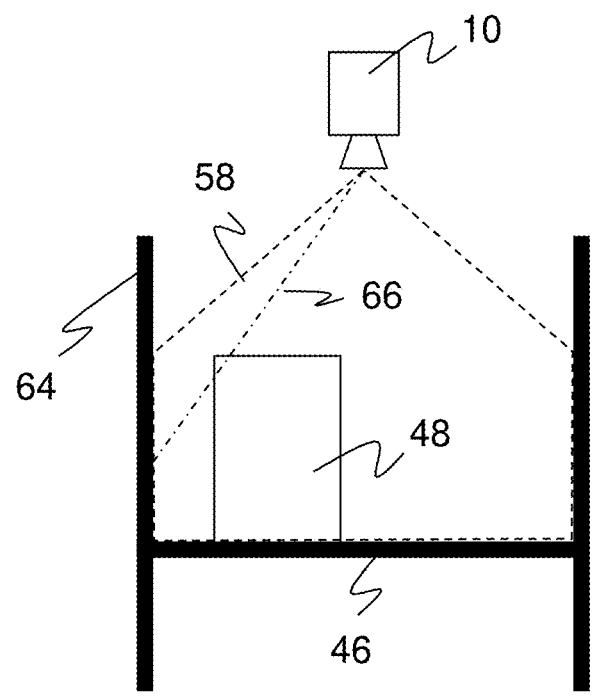
FIG. 4 an exemplary illustration of a camera having an adapted field of view of the distance sensor above a conveyor belt with lateral structures.

Conversely, high objects 48 in particular may have been detected by measuring zones that are not directed at the conveyor belt 46. This is illustrated in FIG. 4. Here, the conveyor belt 46 is framed by lateral structures 64, such as poles or similar interfering objects or structures. A measuring zone with measuring beam 66 has detected a high object 48 and has therefore initially been assigned to the object region. Without the object 48, however, the measuring beam 66 does not actually impinge on the conveyor belt 46, but on the lateral structures 64.

Figure 5:
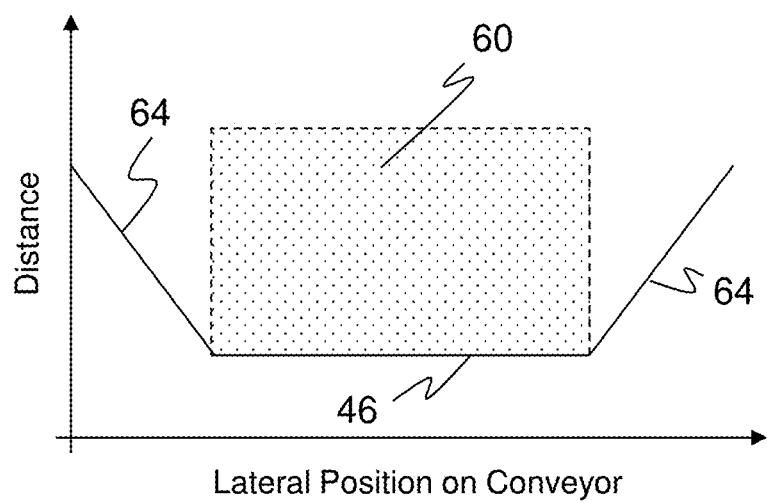
FIG. 5 a representation of the measured distance values in dependence on the lateral position of a conveyor belt as well as the adjusted field of view of the distance sensor in the example situation of FIG. 4.

As illustrated in FIG. 5, this case can be detected by the background measurement, and the corresponding measuring zone of the measuring beam 66 can be excluded from the region of interest 60, although it was initially part of the object region. Shown is the distance value as a function of the position on the conveyor belt in a direction transverse to the direction of movement 50. The flat section in the center corresponds to the conveyor belt 46, while laterally the distance values deviate. The latter is done in the example of FIG. 5 with a flatter profile than in FIG. 4. Measurement zones where the maximum distance value of the background measurement does not correspond to the flat conveyor belt 46 can thus be excluded. Preferably, a tolerance threshold is taken into account, which depends on the specific environment and is preferably determined for each application.

The invention claimed is:

1. A method for detecting objects (48) moving in a direction of movement (50), the method comprising:
   using an image sensor (18) for recording image data of the objects (48) in a camera field of view (14, 56);
   using an optoelectronic distance sensor (24) according to a principle of a time-of-flight method having a plurality of measurement zones (30a) for measuring a plurality of distance values to the objects (48) in a distance measurement field of view (58);
   using signals from the image sensor (18) and the distance sensor (24) to measure distance values over a configuration time and to evaluate at least one of the distance values and a change of the distance values, a region where objects (48) move, and to automatically set a region of interest (60) for the distance sensor (24) within the distance measurement field of view (58) by determining an object region as the region where objects (48) move;
   determining a statistical measure for changes in the distance values of a respective measurement zone (30a) over a variation time; and
   determining a respective maximum value of the distance values of a respective measurement zone (30a) over a background detection time.

2. The method according to claim 1, further comprising adjusting the region of interest (60) based on the maximum values and an expected background geometry.

3. The method according to claim 2, wherein the adjustment concerns a direction transverse to the direction of movement (50).

4. The method according to claim 1, further comprising restricting the region of interest (60) along the direction of movement (50) to an entrance region directed towards the moving objects (48).

5. A method for detecting objects (48) moving in a direction of movement (50), the method comprising:
   using an image sensor (18) for recording image data of the objects (48) in a camera field of view (14, 56);
   using an optoelectronic distance sensor (24) according to a principle of a time-of-flight method having a plurality of measurement zones (30a) for measuring a plurality of distance values to the objects (48) in a distance measurement field of view (58);
   using signals from the image sensor (18) and the distance sensor (24) to measure distance values over a configuration time and to evaluate at least one of the distance values and a change of the distance values, a region where objects (48) move, and to automatically set a region of interest (60) for the distance sensor (24) within the distance measurement field of view (58) by determining an object region as the region where objects (48) move; and
   determining a respective maximum value of the distance values of a respective measurement zone (30a) over a background detection time.

6. The method according to claim 1,
   wherein the distance measurement field of view (58) projects beyond the camera field of view (56).

7. The method according to claim 6,
   wherein the distance measurement field of view (58) projects beyond the camera field of view (56) against the direction of movement (50).

8. The method according to claim 1, further comprising reading out code contents of codes (52) in the recorded image data of the objects (48).

9. The method according to claim 1,
   which is stationarily mounted on a conveyor device (46) which conveys the objects (48) in the direction of movement (50).

10. A method for detecting objects (48) moving in a direction of movement (50), the method comprising:
    using an image sensor (18) for recording image data of the objects (48) in a camera field of view (14, 56);
    using an optoelectronic distance sensor (24) according to a principle of a time-of-flight method having a plurality of measurement zones (30a) for measuring a plurality of distance values to the objects (48) in a distance measurement field of view (58),
    wherein the distance sensor (24) comprises a plurality of avalanche photodiodes (30a) operable in Geiger mode;
    using signals from the image sensor (18) and the distance sensor (24) to measure distance values over a configuration time and to evaluate at least one of the distance values and a change of the distance values, a region where objects (48) move, and to automatically set a region of interest (60) for the distance sensor (24) within the distance measurement field of view (58) by determining an object region as the region where objects (48) move,
    wherein the distance sensor (24) comprises a plurality of avalanche photodiodes (30a) operable in Geiger mode, and wherein the region of interest (60) is adjusted by selectively activating the Geiger mode in avalanche photodiodes (30*a*) corresponding to the region of interest (60); and adjusting the region of interest (60) by selectively activating the Geiger mode in avalanche photodiodes (30*a*) corresponding to the region of interest (60).

11. The method according to claim 10, further comprising determining a statistical measure for changes in the distance values of a respective measurement zone (30*a*) over a variation time.

12. The method according to claim 10, further comprising determining a respective maximum value of the distance values of a respective measurement zone (30*a*) over a background detection time.

13. The method according to claim 5, wherein the optoelectronic distance sensor (24) comprises a plurality of avalanche photodiodes (30*a*) operable in Geiger mode, and further comprising adjusting the region of interest (60) by selectively activating the Geiger mode in avalanche photodiodes (30*a*) corresponding to the region of interest (60).

* * * * *